United States Patent
Rudy et al.

(10) Patent No.: US 9,721,595 B1
(45) Date of Patent: Aug. 1, 2017

(54) METHOD FOR PROVIDING A STORAGE DEVICE

(71) Applicant: Western Digital (Fremont), LLC, Fremont, CA (US)

(72) Inventors: Steven C. Rudy, Carmel Valley, CA (US); Christopher L. Beaudry, San Jose, CA (US); Shaoping Li, San Ramon, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 252 days.

(21) Appl. No.: 14/560,731

(22) Filed: Dec. 4, 2014

(51) Int. Cl.
| | |
|---|---|
| G11B 5/127 | (2006.01) |
| H04R 31/00 | (2006.01) |
| G11B 5/31 | (2006.01) |
| G11B 5/48 | (2006.01) |
| G11B 5/39 | (2006.01) |
| G11B 5/11 | (2006.01) |

(52) U.S. Cl.
CPC ............ G11B 5/3169 (2013.01); G11B 5/486 (2013.01); *G11B 5/11* (2013.01); *G11B 5/3909* (2013.01); *G11B 5/3912* (2013.01); *G11B 5/3932* (2013.01); *G11B 5/4886* (2013.01)

(58) Field of Classification Search
CPC ....... G11B 5/11; G11B 5/3912; G11B 5/3932; G11B 5/397; G11B 5/4886; G11B 5/112; G11B 5/3948; G11B 5/3909; G11B 2005/3996; C21D 6/007; C21D 6/001
See application file for complete search history.

(56) References Cited

U.S. PATENT DOCUMENTS

| | | | |
|---|---|---|---|
| 4,670,732 | A | 6/1987 | Church |
| 5,210,667 | A | 5/1993 | Zammit |
| 5,755,612 | A | 5/1998 | Schaenzer et al. |
| 6,016,290 | A | 1/2000 | Chen et al. |
| 6,018,441 | A | 1/2000 | Wu et al. |
| 6,025,978 | A | 2/2000 | Hoshi et al. |
| 6,025,988 | A | 2/2000 | Yan |
| 6,027,397 | A | 2/2000 | Church et al. |
| 6,032,353 | A | 3/2000 | Hiner et al. |
| 6,033,532 | A | 3/2000 | Minami |
| 6,034,851 | A | 3/2000 | Zarouri et al. |
| 6,043,959 | A | 3/2000 | Crue et al. |
| 6,046,885 | A | 4/2000 | Aimonetti et al. |
| 6,049,650 | A | 4/2000 | Jerman et al. |
| 6,055,138 | A | 4/2000 | Shi |
| 6,058,094 | A | 5/2000 | Davis et al. |
| 6,073,338 | A | 6/2000 | Liu et al. |
| 6,078,479 | A | 6/2000 | Nepela et al. |
| 6,081,499 | A | 6/2000 | Berger et al. |

(Continued)

OTHER PUBLICATIONS

Steven C. Rudy, et al., U.S. Appl. No. 13/631,802, filed Sep. 28, 2012, 23 pages.

*Primary Examiner* — Paul D Kim
(74) *Attorney, Agent, or Firm* — Foley & Lardner LLP

(57) ABSTRACT

A method for providing a storage device that includes a plurality of read sensor stacks for each reader of the storage device. The plurality of read sensor stacks are distributed along a down track direction and offset in a cross-track direction. A plurality of electronic lapping guides (ELGs) are provided for the read sensor stacks. The read sensor stacks are lapped. Lapping is terminated based on signal(s) from the ELG(s).

11 Claims, 6 Drawing Sheets

(56) References Cited

U.S. PATENT DOCUMENTS

| | | |
|---|---|---|
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,347,983 B1 | 2/2002 | Hao et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |

(56) References Cited

U.S. PATENT DOCUMENTS

| | | |
|---|---|---|
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,758,722 B2 | 7/2004 | Zhu |
| 6,760,196 B1 | 7/2004 | Niu et al. |
| 6,760,197 B2 | 7/2004 | Boutaghou et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,786,803 B2 | 9/2004 | Crawforth et al. |
| 6,791,793 B1 | 9/2004 | Chen et al. |
| 6,791,807 B1 | 9/2004 | Hikami et al. |
| 6,793,557 B2 | 9/2004 | Bunch et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,884,148 B1 * | 4/2005 | Dovek ............ B24B 37/30 451/5 |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,950,289 B2 | 9/2005 | Lam et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,206,172 B2 | 4/2007 | Ding et al. |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,358,152 B2 | 4/2008 | Kub et al. |
| 7,359,152 B2 | 4/2008 | Matono et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |

(56) References Cited

U.S. PATENT DOCUMENTS

| | | |
|---|---|---|
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,564,110 B2 | 7/2009 | Beach et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,643,250 B2 | 1/2010 | Araki et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,861,400 B2 | 1/2011 | Lille |
| 7,869,160 B1 | 1/2011 | Pan et al. |
| 7,872,824 B1 | 1/2011 | Macchioni et al. |
| 7,872,833 B2 | 1/2011 | Hu et al. |
| 7,874,063 B2 | 1/2011 | Matono et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,003,304 B2 | 8/2011 | Nikitin et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,065,788 B2 * | 11/2011 | Guruz .................. G11B 5/1278 29/603.09 |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,361,541 B2 | 1/2013 | Lee et al. |
| 8,373,945 B1 | 2/2013 | Luo et al. |
| 8,375,564 B1 | 2/2013 | Luo et al. |

(56) References Cited

U.S. PATENT DOCUMENTS

| | | |
|---|---|---|
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,407,882 B2 | 4/2013 | Seki et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,824,106 B1* | 9/2014 | Garfunkel ............ G11B 5/2654 360/316 |
| 9,042,059 B1* | 5/2015 | Katine ................ G11B 5/3909 360/316 |
| 2006/0028770 A1* | 2/2006 | Etoh .................... G11B 5/1278 360/313 |
| 2007/0030594 A1 | 2/2007 | Biskeborn et al. |
| 2010/0290157 A1 | 11/2010 | Zhang et al. |
| 2011/0086240 A1 | 4/2011 | Xiang et al. |
| 2011/0276287 A1 | 11/2011 | Iben et al. |
| 2012/0087045 A1* | 4/2012 | Yanagisawa ........... B82Y 25/00 360/294 |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |

(56) References Cited

U.S. PATENT DOCUMENTS

| | | |
|---|---|---|
| 2014/0154529 A1 | 6/2014 | Yang et al. |
| 2014/0175050 A1 | 6/2014 | Zhang et al. |
| 2015/0116867 A1* | 4/2015 | Childress ............. G11B 5/3906 360/319 |
| 2015/0325260 A1* | 11/2015 | Singleton ............. G11B 5/3912 360/319 |

* cited by examiner

METHOD FOR PROVIDING A STORAGE DEVICE

BACKGROUND

FIG. 1 depict an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures. These magnetic bias structures are used to magnetically bias the sensor layer of the sensor 14.

Although the conventional magnetic recording transducer 10 functions, there are drawbacks. In particular, the conventional magnetic recording transducer 10 may not function adequately at higher recording densities. Two-dimensional magnetic recording (TDMR) technology may enable significantly higher recording densities. In TDMR, multiple read sensors are used. These sensors are longitudinally distributed along the cross track direction but are aligned in the down track direction. The central sensor reads the data from a track of interest, while the outer sensors sense the data in adjacent tracks in order to account for noise.

Although TDMR might be capable of higher recording densities, issues may be faced at skew. As a result, the transducer may not perform as desired for all skew angles. In addition, fabrication of the sensors may be challenging. Accordingly, what is needed is a system and method for improving the performance of a magnetic recording read transducer, particular for TDMR.

DETAILED DESCRIPTION OF THE EXEMPLARY EMBODIMENTS

Figure 1:
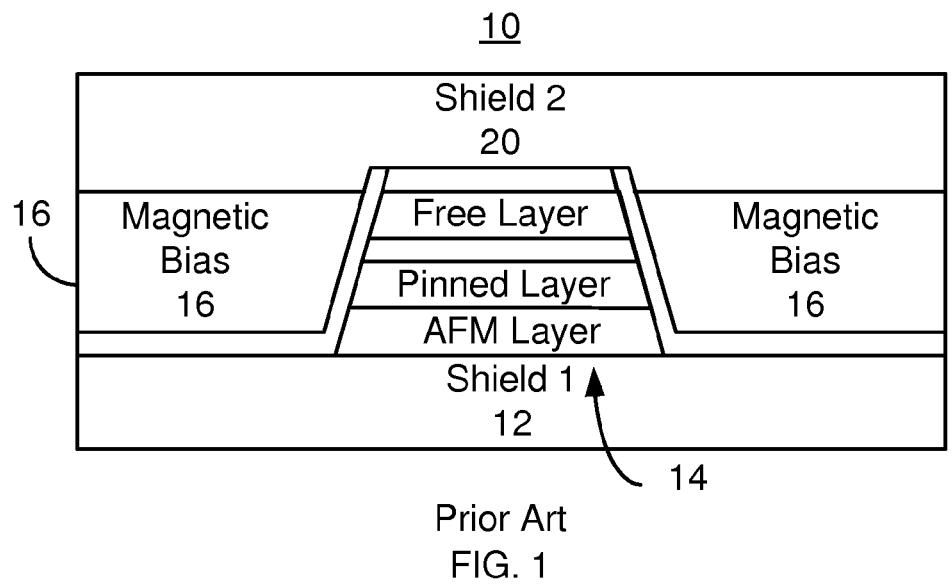
FIG. 1 depicts a conventional read transducer.
Figure 2:
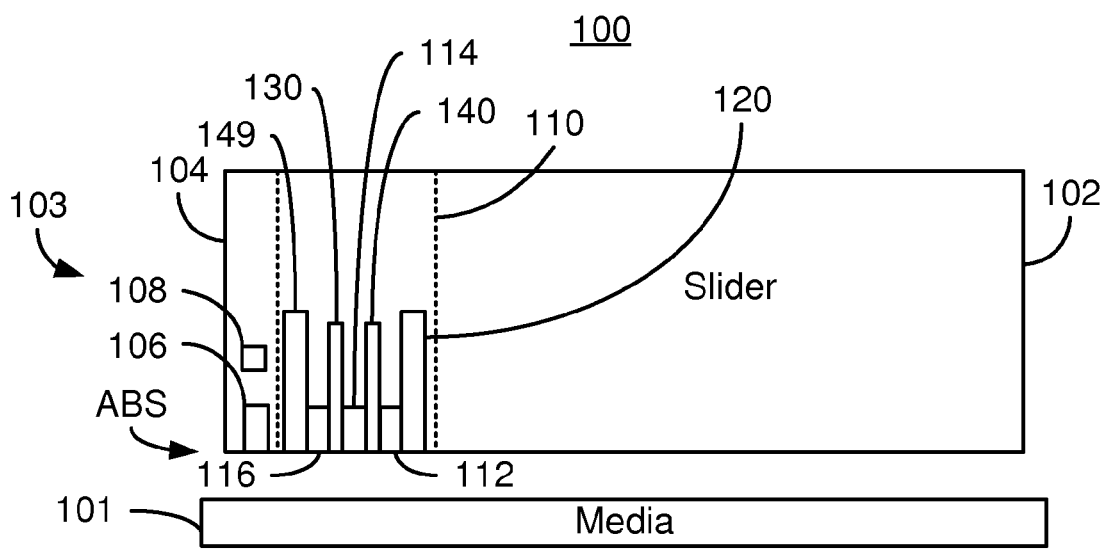
FIG. 2 depicts an exemplary embodiment of a disk drive.
Figure 3A:
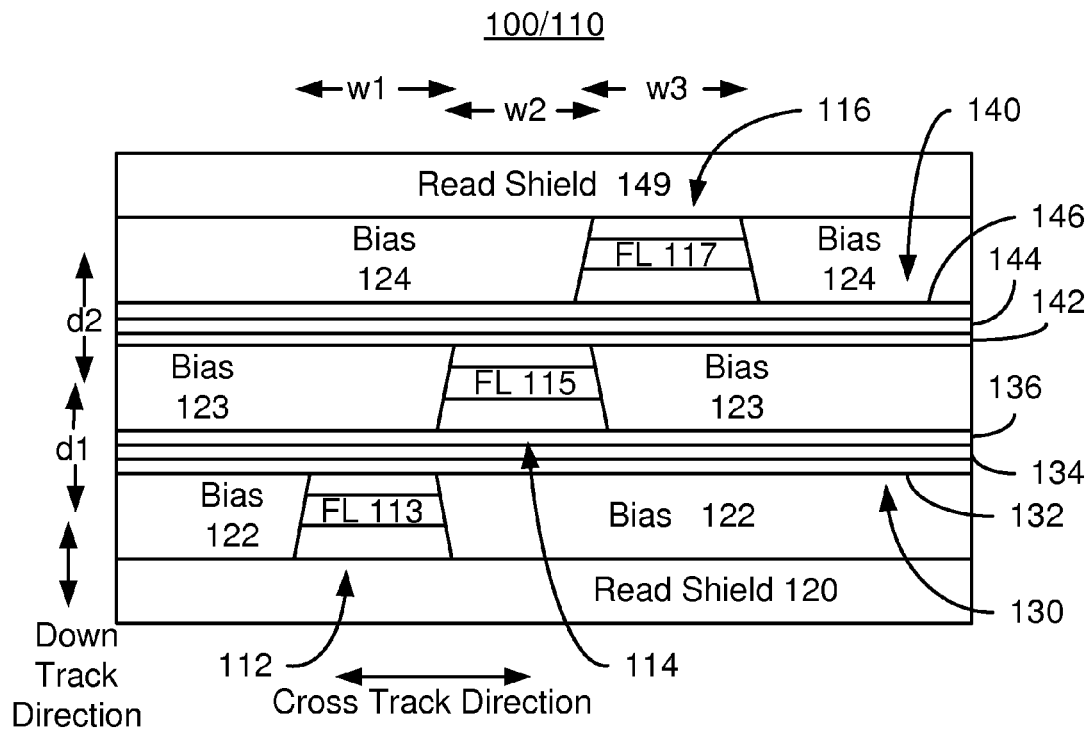
FIGS. 3A and 3B depict ABS-facing views of an exemplary embodiment of a portion of a magnetic recording read transducer including the device and the lapping guides.
Figure 3B:
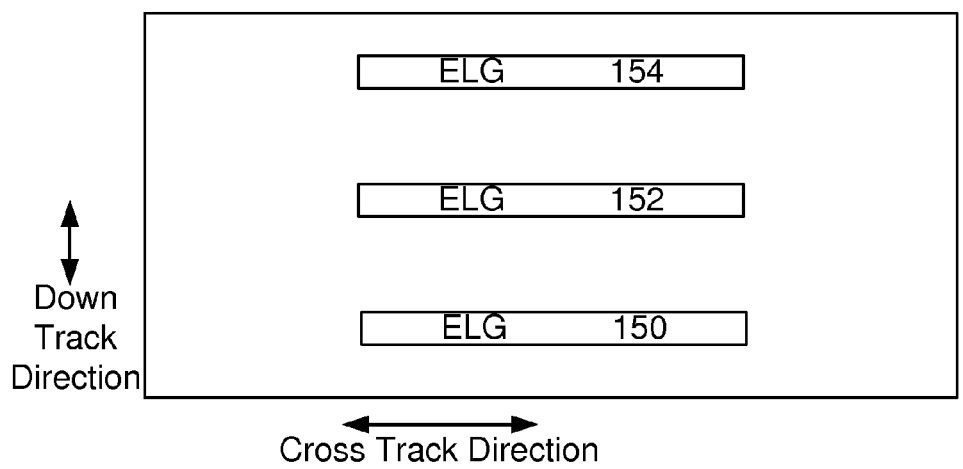

FIGS. 2 and 3A-3B depict side and ABS-facing views of a disk drive 100. For clarity, FIGS. 2, 3A and 3B are not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used. Further, in some embodiments, the devices shown in FIG. 3B may be removed during fabrication and thus not present in the final disk drive 100. However, in other embodiments, the devices shown in FIG. 3B may be present in the finished disk drive 100. Thus, FIG. 3B may be considered to how the disk drive 100 during fabrication, while FIG. 3A may depict the disk drive during fabrication or after manufacturing is complete.

The disk drive 100 includes media 101, a slider 102, a head 103 including a write transducer 104 and a read transducer 110. The write transducer includes at least a write pole 106 and coil(s) 108 for energizing the pole 106. Additional and/or different components may be included in the disk drive 100. Although not shown, the slider 102, and thus the transducers 104 and 110 are generally attached to a suspension (not shown). The transducers 104 and 110 are fabricated on the slider 102 and include an ABS proximate to the media 101 during use. Although both a write transducer 104 and a read transducer 110 are shown, in other embodiments, only a read transducer 110 may be present.

The read transducer 110 includes multiple read sensors 112, 114 and 116. The read sensors 112, 114 and 116 include sensor layers 113, 115 and 117, respectively, that may be free layers in a magnetoresistive junction such as a giant magnetoresistive (GMR) sensor, a tunneling magnetoresistive (TMR) sensor. Thus, each sensor 112, 114 and 116 may include a pinning layer, a pinned layer, a nonmagnetic spacer layer and a free layer 113, 115, and 117, respectively. For simplicity, only the free layers 113, 115 and 117 are separately labeled in FIG. 3A. The sensors 112, 114 and 116 may also include seed layer(s) (not shown) and capping layer(s) (not shown). The pinning layer is generally an AFM layer that is magnetically coupled to the pinned layer. In other embodiments, however, the pinning layer may be omitted or may use a different pinning mechanism. The free layers 113, 115 and 117 are each shown as a single layer, but may include multiple layers including but not limited to a synthetic antiferromagnetic (SAF) structure. The pinned layer may also be a simple layer or a multilayer. Although shown as extending the same distance from the ABS, the pinned layer may extend further than the corresponding free layer 113, 115, and/or 117, respectively. The nonmagnetic spacer layer may be a conductive layer, a tunneling barrier layer, or other analogous layer. Although depicted as a GMR or TMR sensor, in other embodiments, other structures and other sensing mechanisms may be used for the sensor.

Although described as read sensors, if FIG. 3A is considered to depict the transducer 110 before completion, particularly before lapping, the sensors 112, 114 and 116 may be read sensor stacks. Read sensor stacks include the layers provided for the read sensors, but definition of the stacks may not be completed. For example, lapping of the transducer 110 may not have been performed. However, the track widths of the sensors would have been defined in the cross track direction. For simplicity, when referring to FIG. 3A, items 112, 114 and 116 are generally termed sensors.

The read sensors 112, 114 and 116 are separated by distances d1 and d2 in a down track direction. The down track direction is perpendicular to the cross track direction. The cross track direction and track width direction are the same. In the embodiment shown in FIGS. 2-3B, the distance d1 and d2 between the sensors 112 and 114 and between the sensors 114 and 116, respectively, are the same. However, in other embodiments, the distances between the sensors 112, 114 and 116 may not be the same. It is generally desirable to reduce the distance between the sensors 112, 114 and 116 in order to reduce the skew effect. The distances d1 and d2 may each be at least ten nanometers and not more than four hundred nanometers. The read sensors 112, 114 and 116 may have multiple widths, w1, w2 and w3, respectively, in the track width, or cross-track, direction. However, in other embodiments, other widths are possible. The widths of the sensors 112, 114 and 116 may also be based on the track pitch. The track pitch is the distance from the center of one track to the center of the next track. Further, the widths may depend not only on the track pitch, but also on the distance between the sensors 112, 114 and 116.

The read sensors 112, 114 and 116 may also be displaced along the cross track direction. Therefore, the centers of each of the read sensors 112, 114 and 116 are not aligned along a vertical line that runs the down track direction. In the embodiment shown, none of the read sensors 112, 114 and 116 are aligned along a vertical line that runs in the down track direction. In other embodiments, some or all of the read sensors 112, 114 and 116 may be aligned. The read sensors 112, 114 and 116 may also partially overlap in the track width/cross track direction. However, in other embodiments, the read sensors 112, 114 and 116 may be aligned.

Also shown are bias structures 122, 123 and 124 that magnetically bias the read sensors 112, 114 and 116, respectively. The magnetic bias structure(s) 122, 123 and/or 124 may be soft bias structures fabricated with soft magnetic material(s). In other embodiments, the magnetic bias structure(s) 122, 123 and/or 124 may be hard magnetic bias structures. Other mechanisms for biasing the sensors 112, 114 and 116 might also be used.

The read sensors are separated by shields 130 and 140. The read sensors 112, 114 and 116 and shields 130 and 140 are surrounded by read shields 120 and 149. Thus, as used herein, a shield may be considered to be an internal shield, which is interleaved with read sensors 112, 114 and 116 and between the outer, read shields. The outermost shields for the read transducer 110 are termed read shields. In the embodiment shown in FIGS. 2-3B, three read sensors 112, 114 and 116 and two internal shields 130 and 140 are shown. However, in another embodiment, another number of read sensors 112, 114 and 116 and internal shields 130 and 140 may be present. The shields/read shields 120, 130, 140 and 149 generally include soft magnetic material. In some embodiments, one or more of the shields 120, 130, 140 and 149 may include ferromagnetic layers that are antiferromagnetically coupled.

The shields 130 and 140 may be configured to not only magnetically shield the sensors 112, 114 and 116, but also to provide electrical isolation. As a result, each shield 130 and 140 includes magnetic metallic layers separated by one or more insulating layers. Thus, the shield 130 includes conductive magnetic layers 132 and 136 that are separated by insulating layer 134. Similarly, the shield 140 includes conductive magnetic layers 142 and 146 separated by insulating layer 144. Thus, the shields 130 and 140 may magnetically shield and electrically isolate the sensors 112, 114 and 116.

Electronic lapping guides (ELGs) 150, 152 and 154 for the transducer 110 and disk drive 100 are shown in FIG. 3B. The ELGs 150, 152 and 154 are used to control lapping of the transducer 110 and thus the stripe heights of the sensors 112, 114 and 116 (length in the stripe height direction). Signal(s) from the ELGs 150, 152 and 154 are used to determine when to terminate lapping of the sensors 112, 114 and 116.

The ELGs 150, 152 and 154 may be formed in the same layers as the sensors 112, 114 and 116, respectively. For example, the ELGs 150, 152 and 154 may be at substantially the same layer as the free layers 113, 115 and 117, respectively, and thus at substantially the same distance from the underlying substrate (not shown). In other words, the ELGs 150 152 and 154 may be coplanar with the sensors 112, 114 and 116, respectively. In some such embodiments, the ELGs 150, 152 and 154 may be coplanar with the sensor layers 113, 115 and 117, respectively. The distances between the ELGs 150 and 152 and the ELGs 152 and 154 may be substantially the same as the distances between the sensors/free layers 112/113 and 114/115 and the sensors/free layers 114/115 and 116/117, respectively. In the embodiment shown in FIGS. 2-3B, therefore, each ELG 150, 152 and 154 corresponds to a sensor 112, 114 and 116, respectively. In other embodiments, the number of sensors and the number of ELGs may not be the same. For example, a single ELG, such as the ELG 152, may be used for controlling lapping of all sensors 112, 114 and 116. In other embodiments, two ELGs may be used for three sensors. Other configurations may also be possible.

The ELGs 150, 152 and 154 may be configured in various manners. In some embodiments, each ELG 150, 152 and 154 may have its own contacts, allowing independent determinations of the resistances of the ELGs 150, 152 and 154. In other embodiments, at least some of the ELGs 150, 152 and 154 may share contacts. For example, the ELGs 150, 152 and 154 may be coupled in series. In such an embodiment, various sub-configurations are possible. For example, only two leads, a first for one side of the ELG 150 and a second for the opposite side of the ELG 154 may be provided. In other embodiments, additional other contacts and leads may be used for separate determinations of the resistance(s) of one or more of the ELGs 150, 152 and 154. In another embodiment, the ELGs 150, 152 and 154 may be connected in parallel. In such an embodiment one lead may connect to one side of the ELGs 150, 152 and 154, while the other lead connects to the other side of the ELGs 150, 152 and 154. Additional contacts and/or leads may be provided for the ELGs 150, 152 and/or 154 in order to isolate the ELG 150, 152 or 154 to independently determine its properties.

Using the ELG(s) 150, 152 and/or 154, lapping of the sensor stacks/sensors 112, 114 and 116 may be controlled. A signal from the ELG(s) 150, 152 and/or 154 may be used to determine when to terminate lapping of the transducer 110. This signal may correspond to the resistance(s) of the ELG(s) 150, 152 and/or 154. The resistances of the ELGs 150, 152 and 154 during lapping correspond to the stripe heights of the ELGs 150, 152 and/or 154 during lapping. As the resistances change, the stripe heights change. The ELG stripe heights correspond to stripe heights of the sensors 112, 114 and 116. Thus, the desired sensor stripe heights may be determined, the corresponding ELG stripe heights determined, and the target resistances of the ELGs 150, 152 and 154 set based on these stripe heights. When the measured resistance(s) of the ELG(s) 150, 152 and/or 154 are the same as the target resistance(s), lapping may be terminated.

Because one or more ELGs 150, 152 and/or 154 are used, fabrication of the transducer 110 may be improved. Use of a single ELG 150, 152 or 154 allows some control over lapping and, therefore, the stripe height of the sensors 112, 114 and 116. If multiple ELGs 150, 152 and/or 154 are used, this control may be improved. For example, lapping may be terminated when a combination of the stripe heights of the sensors 112, 114 and 116 is, as determined by the ELG signals, optimized. For example, if a single ELG 152 were used, lapping may be optimized for only the sensor 114. When some combination of the ELGs 150, 152 and 154 are used, a combination of the stripe heights of the sensors 112, 114 and 116 may be optimized.

Figure 4A:
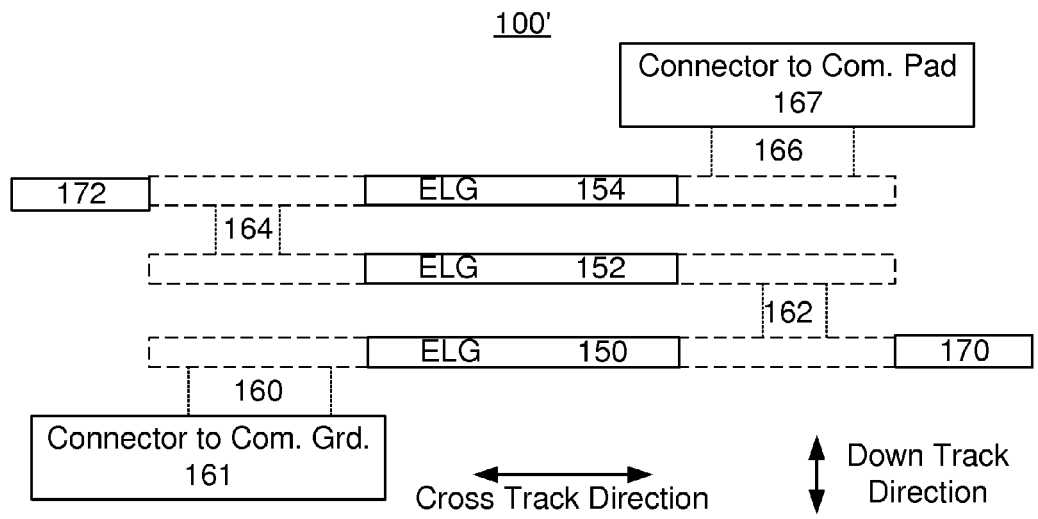
FIGS. 4A-4D depict views of an exemplary embodiment of electrical connections made to the ELGs for a magnetic recording read transducer.
Figures 4B, 4C, 4D:
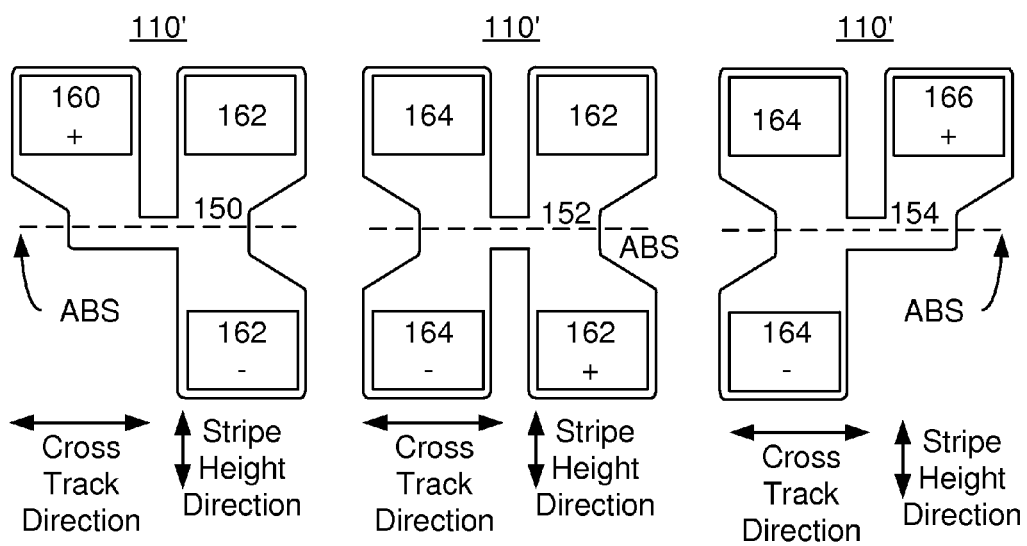

For example, FIGS. 4A-4D depict views of an exemplary embodiment of ELGs 150, 152 and 154 and their electrical connections for a magnetic recording read transducer 110' and disk drive 100'. The read transducer 110' and disk drive 100' are analogous to the read transducer 110 and disk drive 100, respectively. Consequently, similar components have analogous labels. Thus, the ELGs 150, 152 and 154 depicted in FIG. 4A are analogous to the ELGs 150, 152 and 154 depicted in FIG. 3B and used in connection with the sensors/sensor stacks 112, 114 and 116. Referring to FIGS. 3A and 4A-4D, FIG. 4A depicts an ABS-facing view, while FIGS. 4B, 4C and 4D depict plan views of the ELGs 150, 152 and 154, respectively. In the embodiment depicted in FIGS. 4A-4D, the ELGs 150, 152 and 154 are connected in series. Three ELGs 150, 152 and 154 corresponding to the sensors/sensor stacks 112, 114 and 116, respectively are shown. In other embodiments, another number of ELGs may be used.

In addition to the ELGs 150, 152 and 154, common ground connector 161, common pad connector 167, vias 160, 162, 164 and 166 and optional connectors 170 and 172 are shown. The ELG 152 is shown as having a mirror image configuration of pads, while the ELGs 150 and 154 have a partial mirror image. In other embodiments, other pad configurations may be used. The ELG 150 is thus connected to common ground connector 161 through via 160 and to ELG 152 through via 162. The ELG 152 is connected to the ELG 154 and optional connector 172 through via 164. The ELG 154 is connected to the common pad 167 through via 166. The specific manner in which the optional connectors 170 and 172 are connected to the appropriate portions of the ELGs 150, 152 and 154.

Common pads 161 and 167 allow for a single resistance measurement of the series resistance of the ELGs 150, 152 and 154 to be made using two pads. Optional connectors 170 and 172 allow for the resistance of each of the ELGs 150, 152 and 154 to be independently measured. For example, the ELG 150 may have its resistance measured using connectors 161 and 167. The ELG 152 may have its resistance independently measured using connectors 170 and 172. The ELG 154 may have its resistance independently measured using connectors 172 and 167. In other embodiments, one or both of the connectors 170 and 172 may be omitted.

In some embodiments, a measure of the stripe height, target lapping resistance and, therefore, target signal from the ELGs 150, 152 and 154 may be determined as follows. The resistance of ELG 150, $R_{150}$, may be given by $R_{150}=[(W_{150}/SH_{150})+K_{150}]R_{s150}$, where $W_{150}$ is the track width (width in the cross track direction) of ELG 150; $SH_{150}$ is the stripe height of ELG 150 (length in the stripe height direction perpendicular to the ABS and perpendicular to the page in FIG. 4A), $K_{150}$ is the leads resistance constant for ELG 150 and $R_{s150}$ is the sheet resistance of the ELG 150. Similarly, the resistance of ELG 152, $R_{152}$, may be given by $R_{152}=[(W_{152}/SH_{152})+K_{152}]R_{s152}$, where $W_{152}$ is the track width of ELG 152; $SH_{152}$ is the stripe height of ELG 152, $K_{152}$ is the leads resistance constant for ELG 152 and $R_{s152}$ is the sheet resistance of the ELG 152. The resistance of ELG 154, $R_{154}$, may be given by $R_{154}=[(W_{154}/SH_{154})+K_{154}]R_{s154}$, where $W_{154}$ is the track width of ELG 154; $SH_{154}$ is the stripe height of ELG 154, $K_{154}$ is the leads resistance constant for ELG 154 and $R_{s154}$ is the sheet resistance of the ELG 154. The total, series resistance of the ELGs 150, 152 and 154 is $R_{150}+R_{152}+R_{154}$. Thus, the total series resistance of the ELGs 150, 152 and 154 in FIGS. 4A-4D is: $R_{total}=[(M_{a}i/SH_{150})+K_{150}]R_{s150}+[(W_{152}/SH_{152})+K_{152}]R_{s152}+[(W_{154}/SH_{154})+K_{154}]R_{s154}$. Desired stripe heights for the ELGs 150, 152 and 154 may be selected based on a balance of considerations for the corresponding stripe heights of the read sensors 112, 114 and 116, respectively. Based on the desired stripe heights $SH_{150}$, $SH_{152}$ and $SH_{154}$ for the ELGs 150, 152 and 154, respectively, the target resistance of the combination shown in FIGS. 4A-4D may be determined using the equations above. In some embodiments, the parameters such as $W_x$, $SH_x$, $K_x$ and $R_{sx}$ are measured. In other embodiments, the parameters may be set as discussed below. When the actual series resistance of the ELGs 150, 152 and 154 as connected reaches the target resistance, lapping may be terminated.

Figure 5:
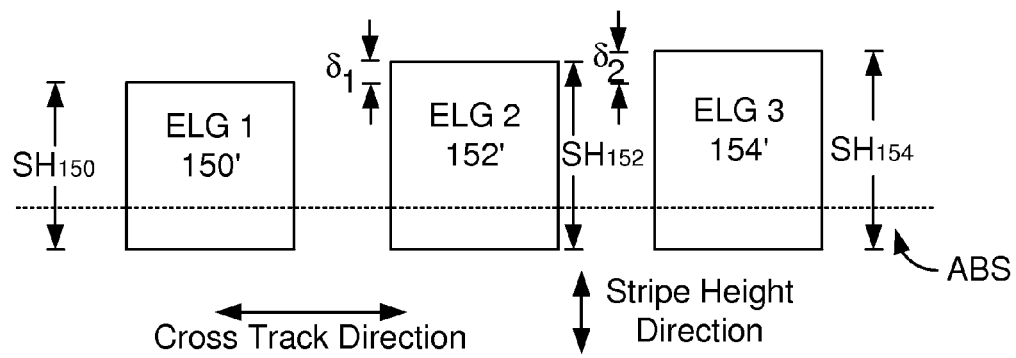
FIG. 5 depicts a plan view of another exemplary embodiment of ELGs for a magnetic recording read transducer.
Figure 6:
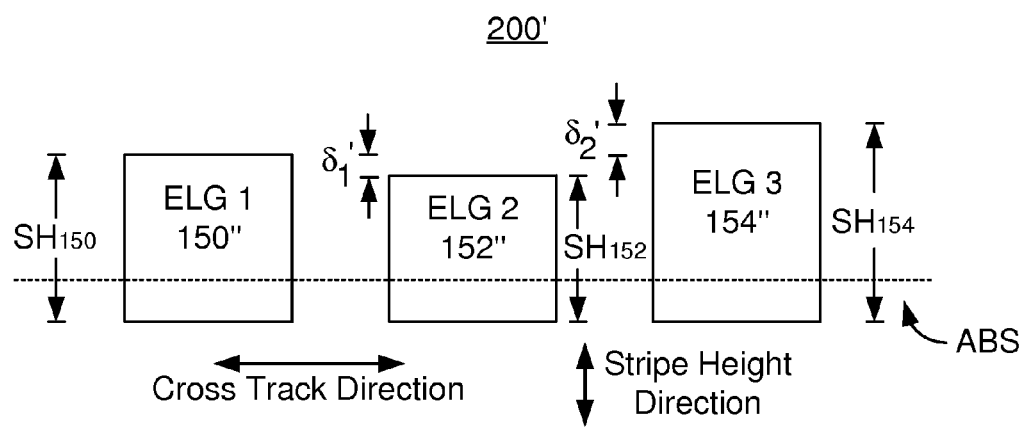
FIG. 6 depicts a plan view of another exemplary embodiment of ELGs for a magnetic recording read transducer.

The desired/target signal may be further calculated as follows. The windage is the offsets in the heights from the design target for the ELGs. The windage thus corresponds to the difference in stripe heights. If the ELG 150 is considered to have a base stripe height, then the stripe heights of ELGs 152 and 154 may be expressed as the stripe height of the ELG 150 and the windages for the ELGs 152 and 154. For example, FIGS. 5 and 6 depict exemplary embodiments of possible windages. In FIG. 5, the ELG 152' and the ELG 154' are both longer than the ELG 150'. Thus, the ELGs 152' and 154' have windages $\delta_1$ and $\delta_2$, respectively, that are both positive. In FIG. 6, the ELG 152" is shorter than the ELG 150" while the ELG 154" is longer. The ELGs 152" and 154" have windage $\delta_1'$ that is negative and positive windage $\delta_2'$, respectively. In other embodiments, other windages are possible. For example, mechanisms which may be used to account for windage are described in U.S. Pat. No. 8,151,441.

Referring back to FIGS. 4A-4D, the ELGs 152 and 154 are presumed to have windages $\delta_{152}$ and $\delta_{154}$, respectively. Thus, the resistances become: $R_{150}=[(W_{150}/SH_{150})+K_{150}]R_{s150}$; $R_{152}=[(W_{152}/(SH_{150}+\delta_{152}))+K_{152}]R_{s152}$ and $R_{154}=[(W_{154}/(SH_{150}+\delta_{154}))+K_{154}]R_{s154}$. Further, the ELGs 150, 152 and 154 may be designed such that the leads resistance constants are substantially the same ($K_{150}=K_{152}=K_{154}=K$). The track widths of the ELGs 150, 152 and 154 may also be set to be substantially the same in some embodiments, ($W_{150}=W_{152}=W_{154}=W$). Although it may be unlikely that the sheet resistances of the ELGs 150, 152 and 154 are the same because they are deposited separately, this might be assumed ($R_{s150}=R_{s152}=R_{s154}=R_s$) for simplification. As a result, the total series resistance may be as approximated by $R_{total}=R_sWK\{(1/(KSH_{150})+1/W+1/(K(SH_{150}+\delta_{152}))+1/W+1/(K(SH_{150}+\delta_{154}))+1/W\}$.

The sensitivity may be considered the change in resistance divided by the changes in stripe height ($\Delta R_{total}/\Delta SH$). Given the above, the sensitivity for the configuration shown in FIGS. 4A-4D may be given by: $R_sWK\{[1/(KSH_{150})]^2+[1/(K(SH_{150}+\delta_{152}))]^2+[1/(K(SH_{150}+\delta_{154}))]^2\}$. In this embodiment, the sensitivity is known and $R_s$, W and K are known or design constants. Thus, the desired stripe heights may be obtained. If a higher level of precision is desired, then the actual sheet resistances ($R_{s150}$, $R_{s152}$ and $R_{s154}$) and windages ($\delta_{152}$ and $\delta_{154}$) for the ELGs 150, 152 and 154 may be measured and used in determining the lapping rate and target resistance. For wafer level measurements prior to lapping, it may be assumed that $\delta_{152}$ and $\delta_{154}$ are much less than $SH_{150}$. In such an embodiment, $SH_{150} = [R_s W/(\Delta R_{total}/\Delta SH)]^{1/2}$ and $SH_{150} = 3/[R_{total}/(R_s W) - 3W]$. These expressions for the stripe height of ELG 150 (or the other ELGs 152 and/or 154) may be used to estimate the upper bounds of the sensor stack stripe height and/or calibrate lapping.

In some embodiments, the ELGs 150, 152 and 154 may have different track widths. In such embodiments, the differences in track widths is to be accounted for. For example, in some such embodiments, the track widths of one of the ELGs may be a multiple of the track width of the remaining ELGs (e.g. $W_{150} = W_{152} = W_{154}/2$). In all embodiments, however, the relevant parameters may either be measured or designed such that the lapping can be controlled using the ELGs 150, 152 and 154 connected in series to give the desired stripe heights for the sensors 112, 114 and 116, within acceptable limits.

Using the ELGs 150, 152 and/or 154 and the signals discussed above, termination of lapping of the sensors 112, 114 and 116 may be controlled such that a balance between the sensor 112, 114 and 116 responses may be achieved. Stated differently, variations in the stripe heights of the sensors 112, 114 and 116 may be better compensated. Optimizing lapping of the sensors 112, 114 and 116 may improve yield and improve performance of the combination of sensors 112, 114 and 116. If the series resistance, for example between connectors 161 and 167, is used, this control may be achieved using only two contact pads. Thus, the configuration of pads used for a single read sensor need not be changed. In other embodiments, accuracy might be further improved by providing pads for each of the ELGs 150, 152 and 154. Resistances, including sheet resistance, may also be measured for each of the ELGs 150, 152 and 154. Windage may be determined based on the sheet resistances. Further, direct feedback for each of the sensors 112, 114 and 116 may be provided during processing using the corresponding ELG 150, 152 and 154, respectively. Finally, subset(s) of the ELGs 150, 152 and 154 may also be used in fabrication of the disk drive. Thus, fabrication of the disk drive 100, 100' and/or 100'' may be improved.

Figure 7:
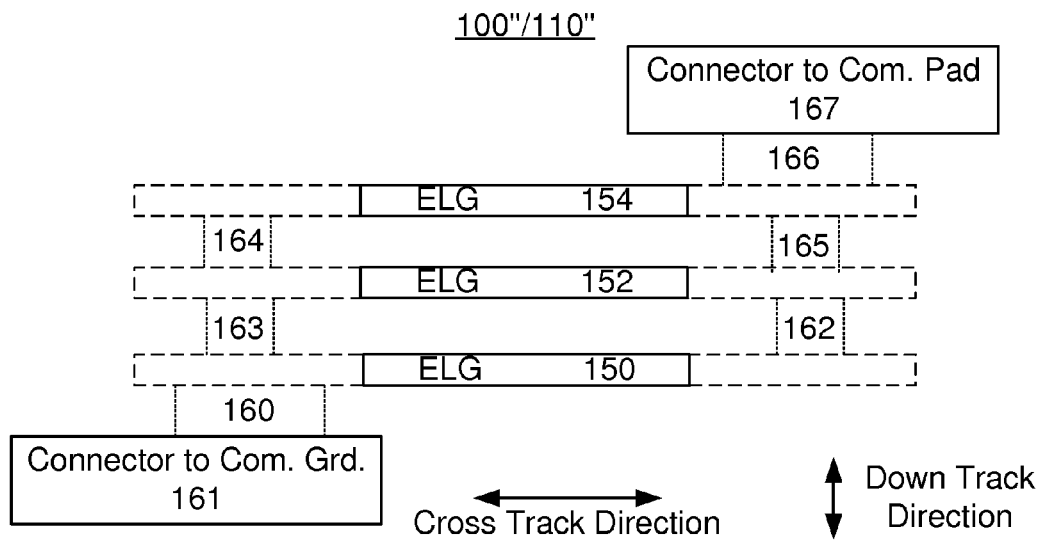
FIG. 7 depicts an ABS-facing view of another exemplary embodiment of ELGs for a magnetic recording read transducer.

FIG. 7 depicts an ABS-facing view of another exemplary embodiment of ELGs for a magnetic recording read transducer 110'' and disk drive 100''. The read transducer 110'' and disk drive 100'' are analogous to the read transducer 110 and disk drive 100. Thus, analogous components have similar labels. Thus, the ELGs 150, 152 and 154 depicted in FIG. 7 are analogous to the ELGs 150, 152 and 154 depicted in FIG. 3B and used in connection with the sensors/sensor stacks 112, 114 and 116. Referring to FIGS. 3A and 7, an ABS-facing view is shown in FIG. 7. In the embodiment depicted in FIG. 7, the ELGs 150, 152 and 154 are connected in parallel. Three ELGs 150, 152 and 154 corresponding to the sensors/sensor stacks 112, 114 and 116, respectively are shown. In other embodiments, another number of ELGs may be used.

In addition to the ELGs 150, 152 and 154, common ground connector 161, common pad connector 167, vias 160, 162, 163, 164, 165 and 166 are shown. The vias 160, 162, 164, 166 and connectors 161 and 167 are analogous to those shown in FIG. 4A. The ELGs 150, 152 and 154 may each have a mirror image configuration of pads. In other embodiments, other pad configurations may be used. The ELG 150 is thus connected to common ground connector 161 through via 160 and to ELG 152 through vias 162 and 163. The ELG 152 is connected to the ELG 154 and optional connector 172 through vias 164 and 165. The ELG 154 is connected to the common pad 167 through via 166. Although not shown, optional connectors for independently determining the resistances of the ELGs 150, 152 and/or 154 may be provided. Such connectors are analogous to the connectors 170 and 172 depicted in FIG. 4A. Common pads 161 and 167 allow for a single resistance measurement of the parallel resistance of the ELGs 150, 152 and 154 to be made using two pads.

In some embodiments, a measure of the stripe height, target lapping resistance and, therefore, target signal from the ELGs 150, 152 and 154 may be determined as follows. The resistances of ELGs 150, 152 and 154 ($R_{150}$, $R_{152}$ and $R_{154}$) are described above. The total, parallel resistance of the ELGs 150, 152 and 154 is $1/(1/R_{150} + 1/R_{152} + 1/R_{154})$. Thus, the total parallel resistance of the ELGs 150, 152 and 154 in FIG. 7 is: $R_{total,\|} = 1/\{[[(W_{150}/SH_{150}) + K_{150}]R_{s150}]^{-1} + [[(W_{152}/SH_{152}) + K_{152}]R_{s152}]^{-1} + [[(W_{154}/SH_{154}) + K_{154}]R_{s154}]^{-1}\}$ Desired stripe heights for the ELGs 150, 152 and 154 may be selected based on a balance of considerations for the corresponding stripe heights of the read sensors 112, 114 and 116, respectively. Based on the desired stripe heights $SH_{150}$, $SH_{152}$ and $SH_{154}$ for the ELGs 150, 152 and 154, respectively, the target resistance of the combination shown in FIG. 7 may be determined using the equations above. In some embodiments, the parameters such as $W_x$, $SH_x$, $K_x$ and $R_{sx}$ are measured. In other embodiments, the parameters may be set as discussed below. When the actual resistance of the ELGs 150, 152 and 154 as connected in parallel reaches the target resistance, lapping may be terminated.

The desired/target signal may be further calculated using the windage described above. The ELGs 152 and 154 are presumed to have windages $\delta_{152}$ and $\delta_{154}$, respectively, with respect to the ELG 150. Thus, the total, parallel resistance becomes $R_{total,\|} = 1/\{[[(W_{150}/SH_{150}) + K_{150}]R_{s150}]^{-1} + [[(W_{152}/(SH_{150} + \delta_{152})) + K_{152}]R_{s152}]^{-1} + [[(W_{154}/(SH_{150} + \delta_{154})) + K_{154}]R_{s154}]^{-1}\}$. As discussed above with respect to the series embodiment, the ELGs 150, 152 and 154 may be designed such that the leads resistance constants are substantially the same and given by K. The track widths of the ELGs 150, 152 and 154 may also be set to be substantially the same in some embodiments, W. Although it is unlikely that the sheet resistances of the ELGs 150, 152 and 154 are the same, this might be assumed ($R_{s150} = R_{s152} = R_{s154} = R_s$) for simplification. As a result, the total parallel resistance may be approximately by $R_{total,\|} = 1/\{[[(W/SH_{150}) + K]R_s]^{-1} + [[(W/(SH_{150} + \delta_{152})) + K]R_s]^{-1} + [[(W/(SH_{150} + \delta_{154})) + K]R_s]^{-1}\}$. The sensitivity, estimated upper bound for the stripe heights and other parameters may be calculated or measured in a manner analogous to that described above in the series case. Similarly, differences in track width may be accounted for. In all embodiments, however, the relevant parameters may either be measured or designed such that the lapping can be controlled using the ELGs 150, 152 and 154 connected in parallel to give the desired stripe heights for the sensors 112, 114 and 116, within acceptable limits.

Figures 8A, 8B:
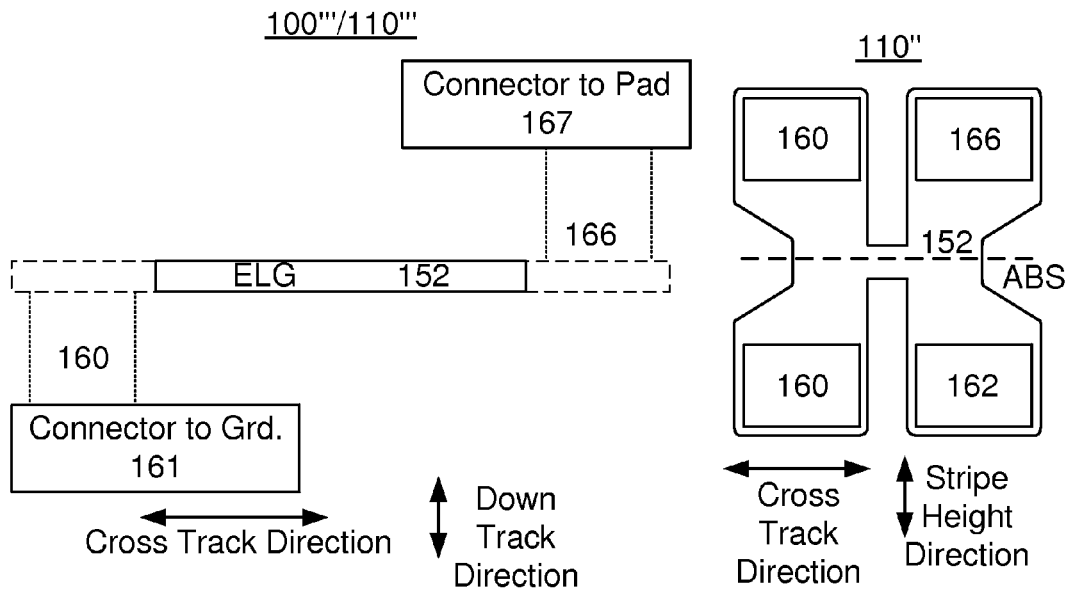
FIGS. 8A-8B depict ABS-facing and plan views of another exemplary embodiment of an ELG for a magnetic recording read transducer.

Using the ELGs 150, 152 and/or 154 and the signals discussed above, termination of lapping of the sensors 112, 114 and 116 may be controlled such that a balance between the sensor 112, 114 and 116 responses may be achieved. Stated differently, variations in the stripe heights of the sensors 112, 114 and 116 may be better compensated. Optimizing lapping of the sensors 112, 114 and 116 may improve yield and improve performance of the combination of sensors 112, 114 and 116. If the parallel resistance, for example between connectors 161 and 167, is used, this control may be achieved using only two contact pads. Thus, the configuration of pads used for a single read sensor need not be changed. In other embodiments, accuracy might be further improved by providing pads for each of the ELGs 150, 152 and 154. Resistances, including sheet resistance, may also be measured for each of the ELGs 150, 152 and 154. Windage may be determined based on the sheet resistances. Further, direct feedback for each of the sensors 112, 114 and 116 may be provided during processing using the corresponding ELG 150, 152 and 154, respectively. Subset(s) of the ELGs 150, 152 and 154 may also be used in fabrication of the disk drive. Thus, fabrication of the transducer 110 and/or 110''' may be improved FIGS. 8A and 8B depict an ABS-facing view and a plan view, respectively, of another exemplary embodiment of an ELG for a magnetic recording read transducer 110''' and disk drive 100'''. The read transducer 110''' and disk drive 100''' are analogous to the read transducer 110 and disk drive 100. Thus, analogous components have similar labels. Thus, the ELG 152 depicted in FIGS. 8A and 8B is analogous to the ELG 152 depicted in FIG. 3B and used in connection with the sensors/sensor stacks 112, 114 and 116. Although the ELG 152, which corresponds to the center sensor/sensor stack 114 may be preferred if a single ELG is used, in other embodiments, the ELG 150 or 154 might be employed instead.

In addition to the ELG 152, ground connector 161, pad connector 167 and vias 160 and 166 are shown. The vias 160 and 166 and connectors 161 and 167 are analogous to those shown in FIG. 4A. Additional vias 162 and 164 may be coupled to optional connectors (not shown). The ELG 152 may each have a mirror image configuration of pads. In other embodiments, other pad configurations may be used. The ELG 150 is thus connected to common ground connector 161 through via 160 and to ELG 152 through vias 162 and 163. The ELG 152 is connected to the ELG 154 and optional connector 172 through vias 164 and 165. The ELG 154 is connected to the common pad 167 through via 166. Pads 161 and 167 allow for a single resistance measurement of the ELG 152 to be made using two pads.

In some embodiments, a measure of the stripe height, target lapping resistance and, therefore, target signal from the ELG 152 may be determined as follows. The resistance of ELG 152 is $R_{152}=[(W_{152}/(SH_{150}+\delta_{152}))+K_{152}]R_{s152}$. The desired (or target) stripe height for the ELG 152 may be selected based on a balance of considerations for the corresponding stripe heights of the read sensors 112, 114 and 116, respectively. For example, the desired stripe height of the ELG 152 may be based on the desired stripe height of the sensor 114. The corresponding target resistance may be calculated using the equation above. In some embodiments, the parameters such as $W_{152}$, $SH_{152}$, $K_{152}$ and $R_{s152}$ are measured. In other embodiments, the parameters may be set below. When the actual resistance of the ELG 152 reaches the target resistance, lapping may be terminated.

Using the ELG 152 and the signals discussed above, termination of lapping of the sensors 112, 114 and 116 may be controlled. Because a single sensor is used, fabrication may be simplified and only two contact pads used. Electrical insulation of the ELG 152 may also be improved because no conductive ELGs, such as an ELG 150 or 154, are close to the ELG 152.

Figure 9:
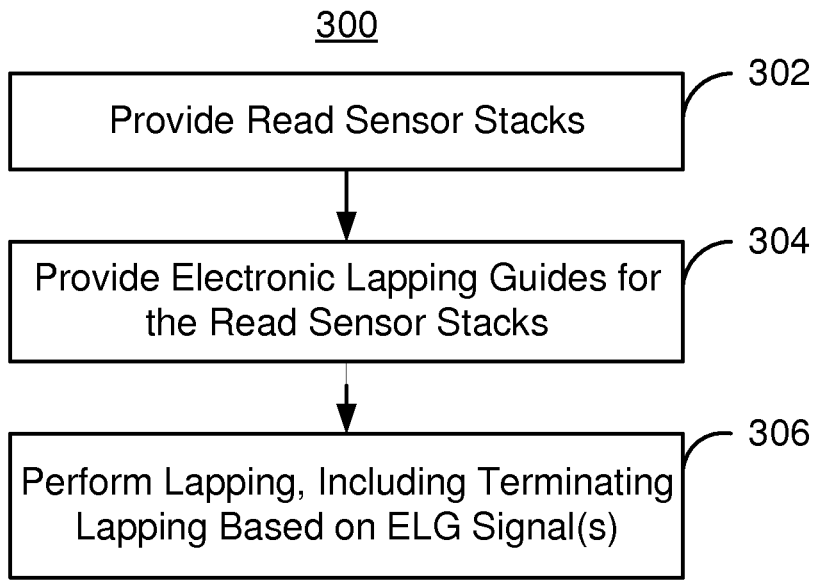
FIG. 9 is a flow chart depicting an exemplary embodiment of a method for fabricating a magnetic recording read transducer.

FIG. 9 is an exemplary embodiment of a method 300 for providing a read transducer having multiple read sensors and using ELG(s) to control lapping. For simplicity, some steps may be omitted, interleaved, and/or combined. The method 300 is also described in the context of providing a single recording transducer 110/110'/110" depicted in FIGS. 2, 3A-3B, 4A-4D and 7. However, the method 300 may be used to fabricate multiple devices on a wafer at substantially the same time. The method 300 may also be used to fabricate other transducers including but not limited to any combination of the transducers 110, 110', 110" and/or 110'''. The method 300 is also described in the context of particular layers. A particular layer may include multiple materials and/or multiple sub-layers. The method 300 also may start after formation of other portions of the magnetic recording transducer.

The read sensor stacks are provided, via step 302. Step 302 typically includes depositing the layers for each of the sensors, then defining the sensors in at least the track width direction. The stripe height away from the ABS may also be defined in step 302. Portions of step 302 are generally interleaved with other steps. For example, the read sensor stack 112 may be formed, then a number of steps occur before formation of the read sensor stack 114. Similarly, a number of steps occur between formation of the read sensor stack 114 and fabrication of the read sensor stack 116.

The ELG(s) 150, 152 and/or 154 are provided, via step 304. In some embodiments, step 304 includes depositing and patterning the conductive material(s) for the ELG(s) 150, 152 and/or 154. Portions of step 304 may be interleaved with portions of step 302 such that the ELG(s) 150, 152 and 154 are at level(s) corresponding to the sensor stacks 112, 114 and 116, respectively. For example, the ELG 150 may be deposited and patterned at around the time that one or more of the layers of the sensor stack 112 is provided. Similarly, the ELG 152 may be deposited and patterned at around the time that one or more of the layers of the sensor stack 114 is provided. The ELG 154 may be deposited and patterned at around the time that one or more of the layers of the sensor stack 116 is provided. Thus, the ELG(s) 150, 152 and 154 are at substantially the same layer(s) in the device as the sensor stacks 112, 114 and 116. Fabrication of the transducer 110, 110' and/or 110" continues until the slider is ready for lapping.

Lapping is then performed until termination that is based upon the ELG signal(s), via step 306. Step 306 may include determining a target resistance for one or more of the ELG(s) 150, 152 and 154 and/or a resistance of a combination of one or more of the ELG(s) 150, 152 and 154. For example, a target for the series or parallel resistance described above may be determined. As is discussed above, this target resistance translates to stripe height(s) of the ELG(s) 150, 152 and/or 154 and to stripe heights of the sensors 112, 114 and 116. When the signal from the ELG(s) 150, 152 and/or 154 reaches the target, lapping may be terminated.

Using the method 300, the transducer 110, 110' and/or 110" and disk drive 100, 100' and/or 100", respectively, may be accomplished. Because lapping is controlled using the signals from the ELG(s) 150, 152 and/or 154, a better balancing of the stripe heights of the sensors 112, 114 and 116 may be achieved. Thus, yield for the method 300 may be improved and device performance enhanced.

Figure 10:
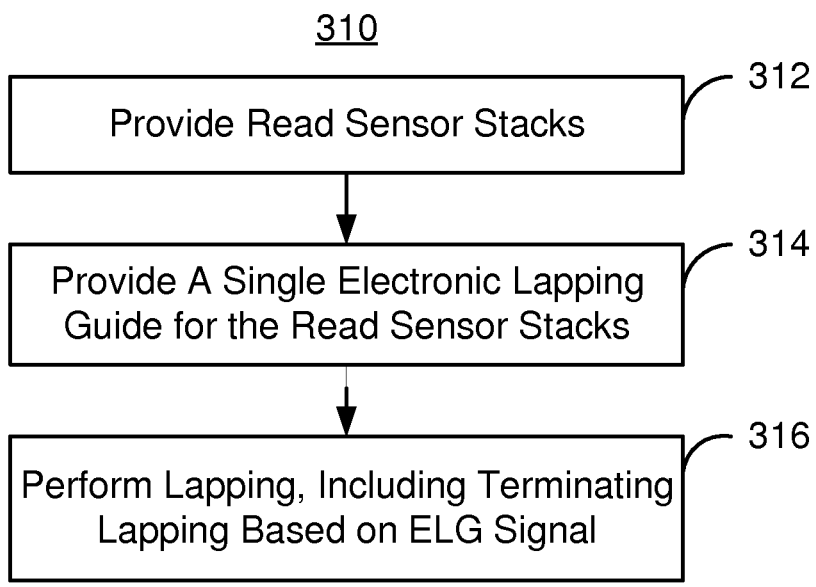
FIG. 10 is a flow chart depicting an exemplary embodiment of a method for fabricating a magnetic recording read transducer.

FIG. 10 is an exemplary embodiment of a method 310 for providing a read transducer having multiple read sensors and using an ELG to control lapping. For simplicity, some steps may be omitted, interleaved, and/or combined. The method 310 is also described in the context of providing a single recording transducer 110''' depicted in FIGS. 2, 3A-3B, and 8A-8B. However, the method 310 may be used to fabricate multiple transducers at substantially the same time. The method 310 may also be used to fabricate other transducers. The method 310 is also described in the context of particular layers. A particular layer may include multiple materials and/or multiple sub-layers. The method 310 also may start after formation of other portions of the magnetic recording transducer.

The read sensor stacks are provided, via step 312. Step 312 typically includes depositing the layers for each of the sensors, then defining the sensors in at least the track width direction. The stripe height away from the ABS may also be defined in step 312. Portions of step 312 are generally interleaved with other steps. For example, the read sensor stack 112 may be formed, then a number of steps occur before formation of the read sensor stack 114. Similarly, a number of steps occur between formation of the read sensor stack 114 and fabrication of the read sensor stack 116. Step 312 is analogous to step 302 of the method 300.

The ELG 152 is provided, via step 314. In some embodiments, step 314 includes depositing and patterning the conductive material(s) for the ELG 152. Portions of step 314 may be interleaved with portions of step 312 such that the ELG 152 is at a location corresponding to the sensor stack 114. For example, the ELG 152 may be deposited and patterned at around the time that one or more of the layers of the sensor stack 114 is provided. In other embodiments, the method 310 may form the ELG 150 or 154 depicted in FIG. 3B instead of the EGL 152. Thus, the ELG 150 is at substantially the same layer(s) in the device as the sensor stacks 114 116. Fabrication of the transducer 110''' continues until the slider is ready for lapping.

Lapping is then performed until termination that is based upon the ELG signal, via step 316. Step 316 may include determining a target resistance for one or more of the ELG 152. As is discussed above, this target resistance translates to stripe height of the ELG 152 and to stripe heights of the sensors 112, 114 and 116. When the signal from the ELG(s) 150, 152 and/or 154 reaches the target, lapping may be terminated.

Using the method 310, the transducer 110''' and disk drive 100''', respectively, may be accomplished. Because of the signals from the ELG(s) 150, 152 and/or 154, lapping may be controlled. Thus, yield for the method 310 may be improved and device performance enhanced. Thus, the benefits of the magnetic transducer(s) 110, 110', 110" and/or 110''' may be achieved.

We claim:

1. A method for providing a storage device comprising:
providing a plurality of read sensor stacks for each reader of the storage device, the plurality of read sensor stacks being distributed along a down track direction and offset in a cross-track direction;
providing a plurality of electronic lapping guides (ELGs) for the plurality of read sensor stacks; and
lapping the plurality of read sensor stacks, the lapping being terminated based on at least one signal from the plurality of ELGs.

2. The method of claim 1 wherein the step of providing the plurality of ELGs further includes:
providing an ELG of the plurality of ELGs for each of the plurality of read sensor stacks.

3. The method of claim 2 wherein the step of providing the plurality of ELGs further includes:
forming the ELG of the plurality of ELGs coplanar with a corresponding read sensor stack of the plurality of read sensor stacks.

4. The method of claim 1 wherein the step of providing the plurality of ELGs further includes:
electrically connecting at least a portion of the plurality of ELGs in series.

5. The method of claim 1 wherein the step of providing the plurality of ELGs further includes:
electrically connecting at least a portion of the plurality of ELGs in parallel.

6. The method of claim 1 wherein the step of providing the plurality of ELGs further includes:
providing a pair of pads for each of the plurality of ELGs.

7. The method of claim 1 wherein the step of providing the plurality of ELGs further includes:
utilizing not more than two pads for the plurality of ELGs.

8. The method of claim 1 wherein the step of providing the plurality of ELGs further includes:
calculating a stripe height windage for at least a portion of the plurality of ELGs.

9. The method of claim 1 wherein the at least one signal is a composite signal from the plurality of ELGs.

10. The method of claim 1 wherein the reader is a magnetic read transducer.

11. A method for providing a storage device comprising:
providing a plurality of read sensor stacks for a single reader of the storage device, the plurality of read sensor stacks being distributed along a down track direction and offset in a cross-track direction;
providing a single electronic lapping guide (ELG) for the plurality of read sensor stacks; and
lapping the plurality of read sensor stacks to form a plurality of read sensors, the lapping being terminated based on a signal from the single ELG.

* * * * *